Feb. 18, 1958   R. E. ZDANOWSKI   2,823,479
ORNAMENTAL ARTICLE
Filed Oct. 25, 1955
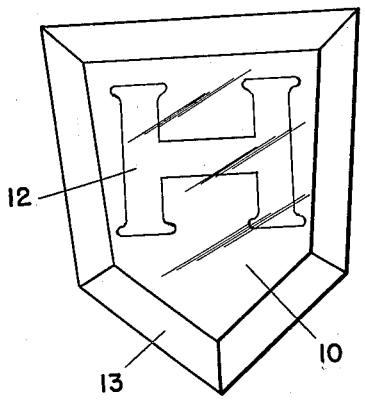
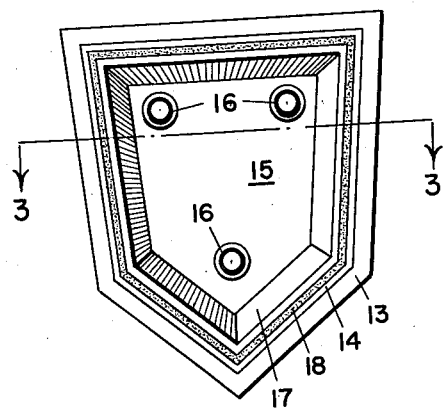
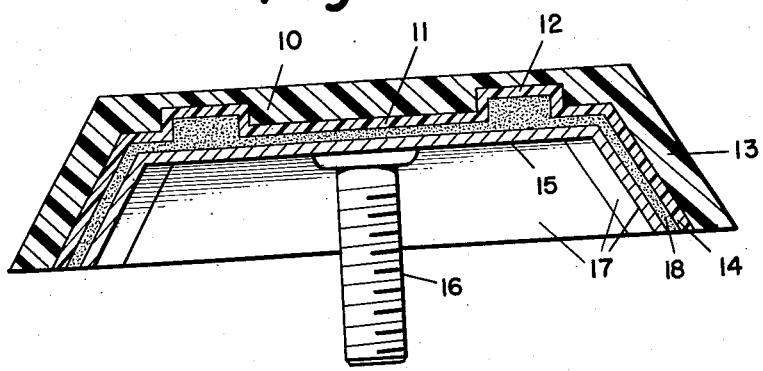
INVENTOR.
RICHARD E. ZDANOWSKI
BY
ATTORNEY

United States Patent Office 2,823,479
Patented Feb. 18, 1958

2,823,479
ORNAMENTAL ARTICLE

Richard E. Zdanowski, Philadelphia, Pa., assignor to Rohm & Haas Company, Philadelphia, Pa., a corporation of Delaware Application October 25, 1955, Serial No. 542,644

1 Claim. (Cl. 41—34)

The present invention relates to improvements in composite articles and to the method of making them. In particular, it concerns improvements of commercial importance in composite articles which may serve, for example, as decorative or identifying means, or both, when attached to other articles of manufacture, such as automobile bodies, household appliances, and the like. In addition the composite article may serve functionally, for example, as a handle or as lifting means for the article to which it is attached.

Extensive use has been made for the purposes above noted of articles comprising plastics of various types including the acrylic plastic sold under the trademark Plexiglas. These articles normally are provided with one or more recessed portions in the rear face of the plastic. In many instances there is applied to the recesses opaque coating materials, preferably of varying colors. In still further instances a second coating is applied to the decorative layer for protective purposes. Such articles and means heretofore proposed for fastening them to other articles are shown, for example, in United States Patents Nos. 2,354,857 and 2,376,305. In general, it has not been feasible to utilize these previously known articles in a practical way to serve a functional purpose aside and apart from their normal decorative or indicative purpose.

In accordance with the invention here set forth the composite article comprises a plastic body portion with such indicia or design, or both, as may be desired showing from its front face. The indicia or design may be formed in the recessed rear face thereof by well-understood methods. A second portion of the composite article comprises a metal plate to which is rigidly secured suitable means for fastening the articles to a body to be identified. The fastening means may be metal studs, clips, struck-out metal portions of the plate itself, or any of the well-known fastening means adapted for the purpose. The metal plate is adhesively bonded to the recessed rear face of the plastic body portion. Furthermore, the metal plate conforms to the contour of and extends over substantially the entire surface of the otherwise exposed area of the recessed rear face of the plastic body portion to which it is adhesively bonded. By adhesively bonding a metal plate substantially coextensive in area with that of the entire recessed rear face of the plastic body portion a durable, weather resistant, composite structure is produced efficiently and economically, both from the standpoint of initial assembly and ultimate affixation to the automobile body or other article of manufacture to which it is to be attached. Furthermore, the assembled parts of such composite structure are so related to each other as to safeguard the "glue line" and resist bond-rupture forces in the direction of shear along the angularly extending outer portion of the assembly as opposed to previously known structures wherein the plastic can relatively easily be separated from the metal by merely applying tension. Thus vandalism, which has to be contended with when articles of this sort are placed in use, is given considerable discouragement and in many instances overcome.

The invention will be more fully understood from the description that follows taken in connection with the accompanying drawing which shows an illustrative embodiment.

Fig. 1 is a front plan view of a composite article within the scope of this invention, Fig. 2 is a rear plan view of such article, and Fig. 3 is an enlarged sectional view of the article taken along line 3—3 of Fig. 2.

In the figures above referred to, 10 designates a transparent plastic body member having a recess 11 in its rear face. A design 12 is formed in the recess 11. An angularly disposed wall 13 defining the recess 11 is provided around the periphery and forms an integral part of the plastic body member 10. Opaque materials, preferably of contrasting colors, are applied for decorative purposes to the design and recess walls as is well understood in the art. One or more layers of protective coating material usually are applied over the entire decorated surface of the recess 11 including the wall 13 and the portion of the recess in which design 12 is formed. The layers of decorative and protective coating materials are designated by the reference number 14.

A metal plate 15 having studs 16 rigidly affixed thereto, for example by welding or brazing, is also provided with an angularly extending wall 17 about its periphery. The face of the main body portion and the wall 17 of metal plate 15, opposite that to which the studs are affixed, is substantially coextensive with the entire recessed rear face of plastic body member 10 with the outer edges of the metal and plastic in close proximity to each other and in substantially the same plane.

The faces last above referred to are bonded to each other over substantially the entire areas thereof by adhesive composition 18. Adhesive composition 18 is characterized in that it will not detrimentally affect the plastic body member 10 or the coating materials 14 which have been applied to the plastic. While maintaining its ability to bond metal to the plastic which has been coated with decorative and protective coatings, adhesive composition 18 has the property of retaining its flexibility and strength over a substantial temperature range to compensate for the difference in thermal expansion of plastic body member 10 and of metal plate 15.

Examples of suitable adhesives include those based on organic polysulfides. These are commercially available and are referred to as adhesives based on Thiokol. A preferred adhesive in this category is one sold by Minnesota Mining & Manufacturing Company under the designation EC–1375B–2.

Commercially available adhesives, such as those containing Neoprene or Hycar rubber, can also be used. Sources of adhesives of the several types above mentioned are shown in the "Adhesives Chart," pages 790, 791 and 792, under the subheading "Rubber-base Adhesives," in the 1954 Edition of "Modern Plastics Encyclopedia," published by Plastics Catalogue Corp., Bristol, Connecticut. Other types of adhesive compositions, such as will provide a bond between the plastic and metal along with flexibility sufficient for maintenance of the bond despite the difference in the coefficient of expansion of such materials, may also be used.

With adhesives that contain ingredients such as solvents or the like which may attack the plastic and/or the decorative material that has been applied to the plastic, it is essential that the protective coating material applied to the rear face of the plastic serve as a barrier coat. This barrier coat is one which is substantially immune from attack and complete penetration by ingredients of the adhesive. Yet surfaces of the barrier coat are such that there will firmly adhere thereto the plastic and interposed decorative material on the one hand and the adhesive on the other. Epoxide resin formulations have been found particularly suited for this purpose. Typical of these is one identified as Cement A-6, sold by Armstrong Products Company of Warsaw, Indiana.

The salient features of this invention will be observed from the general as well as the detailed description of the illustrative embodiment given above. Modifications will readily suggest themselves to those skilled in the art in view of what is taught hereby without departing from the scope of this invention as set forth in the claim hereof.

I claim as my invention:

An ornamental article comprising a plastic body having a rearwardly and outwardly extending continuous wall circumscribing a recess in the rear face thereof which is substantially coextensive in area with its front face except for the thickness of said wall, at least two layers of opaque coating material applied to said recess, the layer immediately adjacent to the plastic serving for decorative purposes and the other layer serving to protect the plastic and decorative layer, a metal plate having on one side means rigidly affixed thereto whereby the composite article may be attached to other articles of manufacture, the other side of said metal plate substantially conforming in area and contour to the entire recessed portion of said plastic body, said metal plate and said plastic body being circumferentially bonded to each other throughout substantially the entire area and contour aforesaid by means of an adhesive.

References Cited in the file of this patent

UNITED STATES PATENTS

| | | |
|---|---|---|
| 707,456 | Shipman | Aug. 19, 1902 |
| 1,282,612 | Massey | Oct. 22, 1918 |
| 2,354,857 | Gits et al. | Aug. 1, 1944 |
| 2,376,305 | Bauer | May 15, 1945 |
| 2,723,433 | Van Buren | Nov. 15, 1955 |